UNITED STATES PATENT OFFICE.

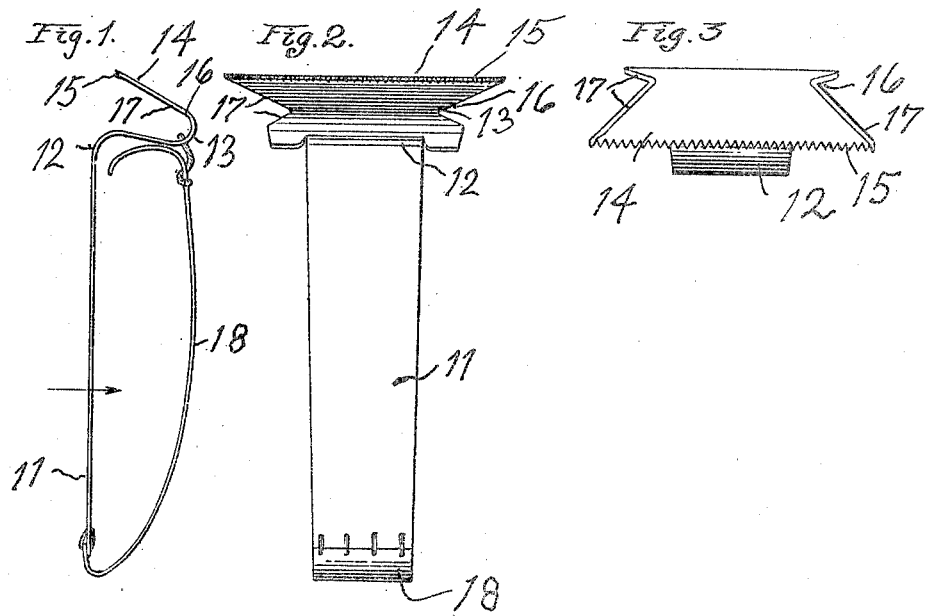

TOKUSABURO SATOW, OF LOS ANGELES, CALIFORNIA.

GRAPE-CUTTER.

1,291,176.  Specification of Letters Patent.  Patented Jan. 14, 1919.

Application filed April 8, 1918. Serial No. 227,223.

*To all whom it may concern:*

Be it known that I, TOKUSABURO SATOW, a subject of the Emperor of Japan, residing at Los Angeles, in the county of Los Angeles and State of California, have invented a new and useful Grape-Cutter, of which the following is a specification.

This invention relates to a new and useful tool adapted for cutting and harvesting the grapes from the vines, and has for its main object the production of a cutter adapted for hand manipulation whereby the harvesting of the grapes may be the more readily accomplished.

To double the capacity of the user to harvest the grapes, I have provided an improved cutter having means for attachment to the hand, and adaptable for use with either hand, the cutter being provided with sharpened edges so that the bunch of grapes may be grasped and at the same time severed with the use of one hand. The device is so constructed as to be adaptable for use in either hand, and one may be employed in each hand of the user, thereby doubling the capacity for work accomplished.

A practical embodiment of the invention is shown in the accompanying drawings, in which:

Figure 1 is a side elevation of my improved grape cutter. Fig. 2 is a front elevation of the cutter, looking in the direction indicated by the arrow in Fig. 1. Fig. 3 is a top plan view of the cutter.

Referring to the drawings, this improved grape cutter is constructed with the shank 11, preferably made of thin sheet metal, and having the bent portions 12 and 13, at the top, and having the outwardly flaring cutting edge 14, which is provided with the serrated cutting edge 15, adapted for use both as a saw and as a knife. The top end is further provided with the notched portions 16, having the angular cutting edges 17. A loop 18, preferably of elastic fabric or of leather, is attached at the bottom and top ends of the cutter, and is adapted to pass over the back of the hand when the cutter is grasped by the operator.

In use, the device is adapted to be grasped by the operator, with the shank lying in the palm of the hand and the loop passing over the back of the hand. The bunch of grapes to be removed from the stem is grasped by the hand that holds the cutter, with the thumb resting upon the stem at the point to be severed. A slight twisting motion is given the hand thereby passing the serrated cutting edge across the stem. Upon bunches of grapes having a heavier stem, the cutter may be first employed as a knife and using the angular notched cutting portions with either an up or down stroke as may be the more convenient. The cutter may be therefore used in the capacity of a knife or of a saw, until the severance of the grapes from the vine is completed. As before stated, a cutter may be employed in each hand by the operator, and the grapes may be therefore the more expeditiously removed from the vines.

While simple and efficient means are herein provided for accomplishing the objects of the invention, and the elements shown and described are well adapted to serve the purposes for which they are intended, it is to be understood that the invention is not limited to the precise construction exhibited in the drawings, but that changes, alterations, and modifications that may fall within the scope of the appended claim may be made if desired, the essence of my invention comprising a cutter adapted for manual operations and provided with a plurality of cutting edges some of which may be employed on an up stroke, some of which may be employed on a down stroke, and some of which may be employed to transversely cut and sever the stem of a bunch of grapes for the purpose of removal from the vine.

What is claimed is:

A grape cutter comprising a shank, a cutter head integral therewith, said cutter head being bent to form an outwardly flaring cutting edge, serrated teeth on the flaring cutting edge, angular cutting edges on the bent portion, and a flexible band connected to the cutting head and to the shank.

In testimony whereof I hereunto affix my signature this 26th day of March, in the year 1918.

TOKUSABURO SATOW.

In presence of—
FREDERIC M. KEENEY,
J. W. MASTRO.